(12) United States Patent
Iwamoto

(10) Patent No.: US 8,898,878 B2
(45) Date of Patent: Dec. 2, 2014

(54) METHOD FOR ATTACHING EXTERIOR COMPONENT

(75) Inventor: Kazuyoshi Iwamoto, Utsunomiya (JP)

(73) Assignee: Honda Access Corp., Niiza-shi (JP)

( * ) Notice: Subject to any disclaimer, the term of this patent is extended or adjusted under 35 U.S.C. 154(b) by 333 days.

(21) Appl. No.: 13/227,000

(22) Filed: Sep. 7, 2011

(65) Prior Publication Data

US 2012/0144648 A1 Jun. 14, 2012

(30) Foreign Application Priority Data

Dec. 9, 2010 (JP) ................................. 2010-275111

(51) Int. Cl.
*B23Q 17/00* (2006.01)
*B23Q 3/00* (2006.01)
*B60R 19/48* (2006.01)
*B62D 35/00* (2006.01)

(52) U.S. Cl.
CPC .............. *B62D 35/005* (2013.01); *B60R 19/48* (2013.01); *B60R 2019/486* (2013.01)
USPC ........... 29/407.1; 29/407.09; 29/423; 29/464; 29/468; 33/645

(58) Field of Classification Search
USPC .............. 29/407.01, 407.09, 407.1, 423, 464, 29/468; 33/613, 645
See application file for complete search history.

(56) References Cited

U.S. PATENT DOCUMENTS

| | | | | |
|---|---|---|---|---|
| 4,288,887 A | * | 9/1981 | Johnson et al. | 16/105 |
| 6,749,197 B1 | * | 6/2004 | Miller et al. | 273/117 |
| 6,928,713 B2 | * | 8/2005 | Baer | 29/434 |
| 7,189,043 B2 | * | 3/2007 | Benoit et al. | 411/104 |
| 7,384,081 B2 | * | 6/2008 | Shishikura | 293/1 |
| 7,607,705 B1 | * | 10/2009 | Mast et al. | 293/117 |
| 7,690,703 B2 | * | 4/2010 | Maruko | 293/102 |
| 8,434,727 B2 | * | 5/2013 | Sakamoto et al. | 248/309.1 |
| 2004/0099855 A1 | * | 5/2004 | Platt | 256/65.05 |
| 2004/0124644 A1 | * | 7/2004 | Miller et al. | 293/117 |

(Continued)

FOREIGN PATENT DOCUMENTS

| | | | | | |
|---|---|---|---|---|---|
| JP | 2002059793 A | * | 2/2002 | | B60R 19/48 |
| JP | 2002-264734 A | | 9/2002 | | |
| JP | 2004352002 A | * | 12/2004 | | B60R 13/04 |
| JP | 2012121504 A | * | 6/2012 | | B60R 19/48 |

OTHER PUBLICATIONS

Machine English translation of JP 2002059793.*

*Primary Examiner* — Essama Omgba
(74) *Attorney, Agent, or Firm* — Westerman, Hattori, Daniels & Adrian, LLP

(57) ABSTRACT

There is provided a method for attaching an exterior component. When attaching an exterior component to a bumper, an attachment member for a first attaching hole of the bumper fixed to the vehicular main body is detached, and then the attachment member is inserted into a first through-hole of the exterior component and the first attaching hole and fixed, thereby temporarily fixing the exterior component. A marking is put on a temporarily fixed portion where a second through-hole faces the bumper, and the exterior component is temporarily detached. A third attaching hole is formed by boring a hole in the marking of the bumper, and then a well nut is fitted into the exterior component, enabling the exterior component to be attached through the first and second through-holes. Accordingly, the marking and positioning of the exterior component can be easily performed without detaching the bumper.

8 Claims, 10 Drawing Sheets

(56) References Cited

U.S. PATENT DOCUMENTS

| | | |
|---|---|---|
| 2006/0137162 A1* | 6/2006 | Shishikura .................... 29/281.1 |
| 2008/0079271 A1* | 4/2008 | Maruko ........................ 293/102 |
| 2008/0290236 A1* | 11/2008 | Sakamoto et al. ......... 248/309.1 |
| 2009/0057512 A1* | 3/2009 | Garmyn .................... 248/220.21 |
| 2009/0108610 A1* | 4/2009 | Dormaier ..................... 296/39.1 |
| 2011/0248135 A1* | 10/2011 | Sakamoto et al. ......... 248/224.8 |
| 2011/0283624 A1* | 11/2011 | Baer ............................... 49/397 |
| 2011/0315846 A1* | 12/2011 | Andren et al. ................ 248/323 |
| 2013/0125372 A1* | 5/2013 | van Niekerk et al. ........... 29/464 |

* cited by examiner

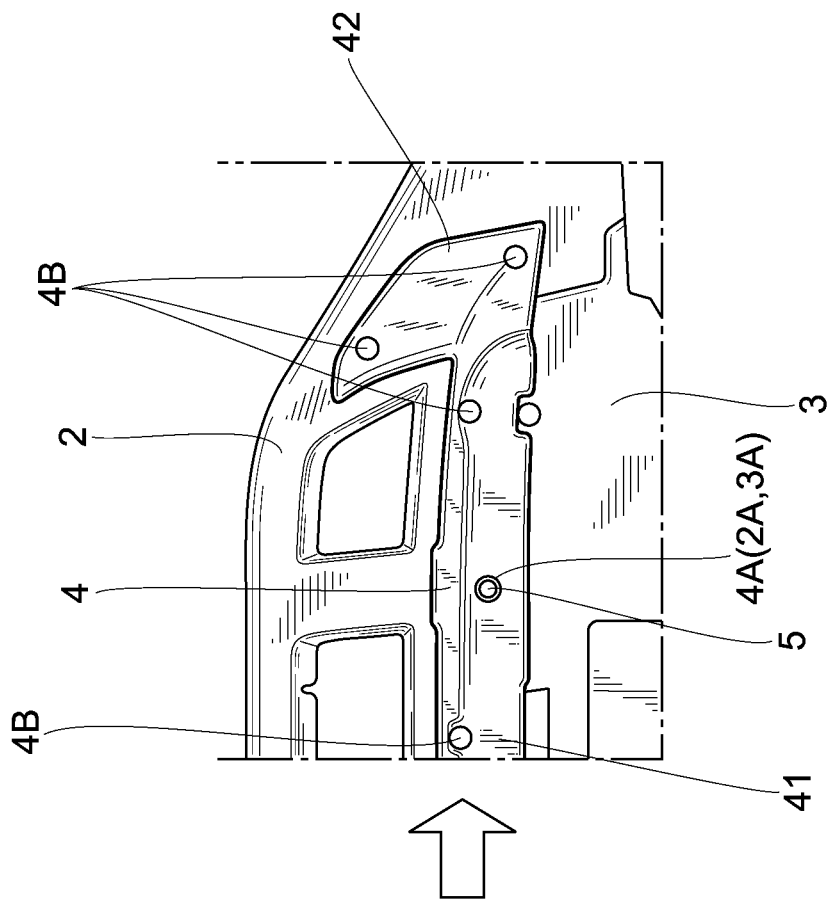
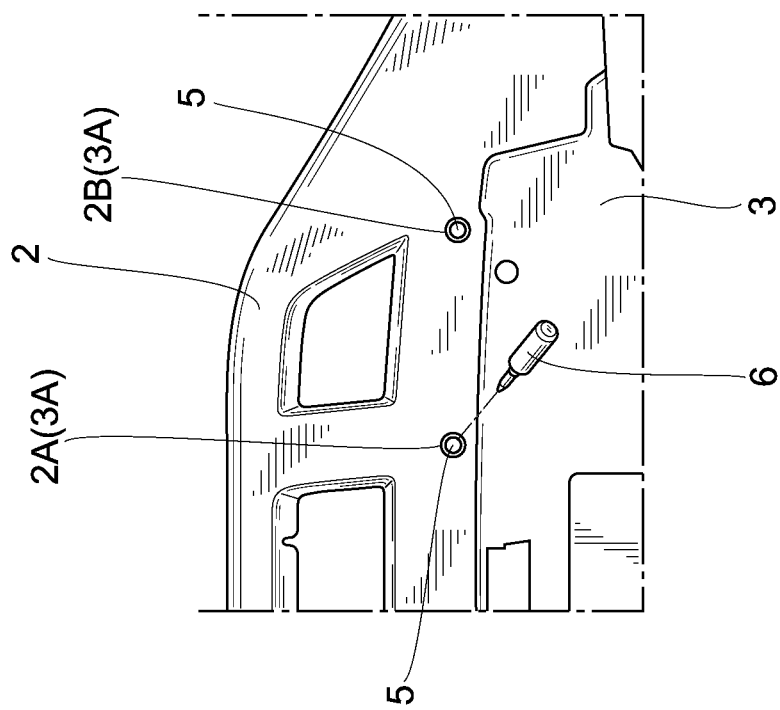

METHOD FOR ATTACHING EXTERIOR COMPONENT

BACKGROUND OF THE INVENTION

1. Field of the Invention

The present invention relates to a method for attaching an exterior component, particularly to a method for attaching the exterior component on a bumper attached to a vehicle.

2. Description of the Related Art

Heretofore, as this sort of method, e.g., there has been disclosed a method for attaching an exterior component without detaching a bumper or the like, ensuring the attaching accuracy of a vehicular exterior component attached to the bumper or the like, as disclosed in e.g., Japanese unexamined patent application publication No. 2002-264734.

The prior art document described above discloses a method for attaching a vehicular exterior component, in which in the process of performing temporary attachment of the vehicular exterior component with a marker on its joint surface on the rear side of the exterior component such as a front lower garnish, aero parts or the like, there is given a marking of an exterior component attaching location by pressing the exterior component directly from its outside and then an attaching hole is bored at the marked location, thereby improving an accuracy of an attaching location when determining the attaching location.

According to the foregoing method for attaching a vehicular exterior component, the exterior component is attached using a marking means, for example, by attaching a retainer on a bumper using a pointed extremity of an edge pin covered with a soft sheet provided on the rear side of the exterior component and a joining implement.

However, in order to scratch on the bumper at locations supposed to be marked, the foregoing attaching method requires that the exterior component be pressedly-contacted by the bumper with pressure applied from the outside thereof, thereby increasing working processes. As a result, there is a possibility to make the process complex and take longer time for attaching process. Further, the joining implement itself employed for performing the attaching operation after the marking is complicated in structure, thereby giving rise to the issue of cost.

SUMMARY OF THE INVENTION

Therefore, in view of the problem described above, it is an object of the present invention to provide a method for attaching an exterior component, by which a worker can perform marking and attach the exterior component with ease without detaching a bumper when attaching the exterior component. It is another object of the present invention to provide a method for attaching an exterior component which can enable a worker to decrease an attaching process with an improved accuracy of an attaching location.

PROBLEM TO BE SOLVED BY THE INVENTION

To attain the above objects of the present invention, a first aspect of the present invention is characterized in that there is provided a method for attaching an exterior component on a bumper fixed to a vehicular main body through a plurality of attachment members. The method comprises steps of temporarily fixing the exterior component to a first attaching location on the bumper by means of at least one of the attachment members used to fix the bumper, determining a second attaching location on the bumper other than the first attaching location in a state of having the exterior component temporarily fixed, detaching the exterior component after determining the second attaching location, providing a receiving portion in the second attaching location determined on the bumper, and fixing the exterior component to the bumper using the receiving portion.

Further, a second aspect of the present invention is characterized in that a marking is put on the second attaching location determined on the bumper in the state of having the exterior component temporarily fixed to the bumper.

Furthermore, a third aspect of the present invention is characterized in that the first attaching location corresponds to a first through-hole provided in the exterior component, while the second attaching location corresponds to a second through-hole provided in the exterior component.

Moreover, a fourth aspect of the present invention is characterized in that a plurality of the first through-holes is included.

Besides, a fifth aspect of the present invention is characterized in that the first attaching location corresponds to a first through-hole provided in the exterior component, while the second attaching location corresponds to a second through-hole provided in the exterior component. The method further comprises the steps of putting a marking on the second attaching location determined on the bumper, boring an attaching hole for a receiving portion in the second attaching location determined, providing the receiving portion in the attaching hole for the receiving portion, and locking another attachment member for the receiving portion penetrating the second through-hole to the receiving portion.

Further, a sixth aspect of the present invention is characterized in that the marking is put on the second attaching location determined of the bumper with the exterior component being temporarily fixed to the bumper.

Furthermore, a seventh aspect of the present invention is characterized in that the exterior component includes a plurality of the first through-holes.

Moreover, an eighth aspect of the present invention is characterized in that after applying the marking, the exterior component is detached and then the attaching hole for the receiving portion is bored in the second attaching location determined.

Besides, a ninth aspect of the present invention is characterized in that the attachment member is repeatedly attachable and detachable for reuse, using a tool and is allowed to penetrate the first through-hole to enable the bumper to be temporarily fixed and then finally fixed.

Further, a tenth aspect of the present invention is characterized in that the exterior component includes a plurality of the second through-holes.

Furthermore, an eleventh aspect of the present invention is characterized in that an elastic seal member is provided in a distal contact portion of the exterior component and when fixing the exterior component, the elastic seal member is sandwiched in the contact portion between the exterior component and the bumper.

Moreover, a twelfth aspect of the present invention is characterized in that the exterior component comprises an exterior component body elongated in a horizontal direction of the vehicle main body and side portions provided integrally on both sides of the exterior component body, wherein the first through-hole in the middle portion of the exterior component body and the second through-holes on the both side portions.

According to the method for attaching an exterior component set forth in the first aspect of the present invention, when attaching the exterior component, the second attaching locations of the exterior component relative to the vehicular main body can be reliably determined while temporarily fixing the exterior component to the bumper, utilizing some of the attachment members between the bumper and the vehicular main body.

In other words, the method for attaching an exterior component according to the first aspect of the present invention permits the exterior component to be attached without detaching the bumper from the vehicular main body at the time of attachment of the exterior component onto the bumper. Hence, the attaching man-hours can be reduced and besides the accuracy of the attaching location of the exterior component can be improved without using a paper template or the like.

Further, according to the method for attaching an exterior component set forth in the second and sixth aspects of the present invention, the second attaching locations can be determined by the marking.

Furthermore, according to the method for attaching an exterior component set forth in the third aspect of the present invention, the exterior component can be temporarily fixed through the first through-hole, and when finally attaching the exterior component onto the bumper, the attachment can be performed through the second through-hole.

Moreover, according to the method for attaching an exterior component set forth in the fourth and seventh aspects of the present invention, the temporary fixing can be reliably performed through a plurality of the first through-holes.

Besides, according to the method for attaching an exterior component set forth in the fifth aspect of the present invention, the attachment member for attaching the bumper onto the vehicular main body is detached and then the attachment member thus detached is allowed to penetrate the first through-hole to temporarily fix the exterior component to the bumper. After putting the marking, the attachment member is detached from the bumper and then the exterior component is detached from the bumper to provide the receiving portion in the location provided with the marking thereon. Hence, the receiving portion can be provided in the accurate location corresponding to the second through-hole, permitting the accuracy of the attaching location of the exterior component to be improved.

Further, according to the method for attaching an exterior component set forth in the eighth aspect of the present invention, the attaching hole for the receiving portion can be bored without interruption by the exterior component.

Furthermore, according to the method for attaching an exterior component set forth in the ninth aspect of the present invention, the attachment members can be utilized for both temporary attachment and final fixing.

Moreover, according to the method for attaching an exterior component set forth in the tenth aspect of the present invention, the exterior component can be attached through a plurality of the second attaching holes.

Besides, according to the method for attaching an exterior component set forth in the eleventh aspect of the present invention, the elastic seal member exerts effects of providing the waterproof performance between the exterior component and the bumper, preventing the contact portion of the exterior component and the bumper from being broken and damaged.

Further, according to the method for attaching an exterior component set forth in the twelfth aspect of the present invention, the exterior component is temporarily fixed through the first through holes at the middle side of the exterior component body, while the marking is applied to the second through holes provided on both sides, it is possible to fix the side portions of the exterior component, which are distant from the first through holes at the middle side, in accurate positions.

BRIEF DESCRIPTION OF THE DRAWINGS

These objects and other objects and advantages of the present invention will become more apparent upon reading of the following detailed description and the accompanying drawings in which:

FIG. 3 is an explanatory drawing illustrating a procedure for temporary fixing in a process of attaching the exterior component according to the present invention.

DETAILED DESCRIPTION OF PREFERRED EMBODIMENTS

Hereunder is a detailed description of embodiments of the present invention with reference to the accompanying drawings.

Figure 1:
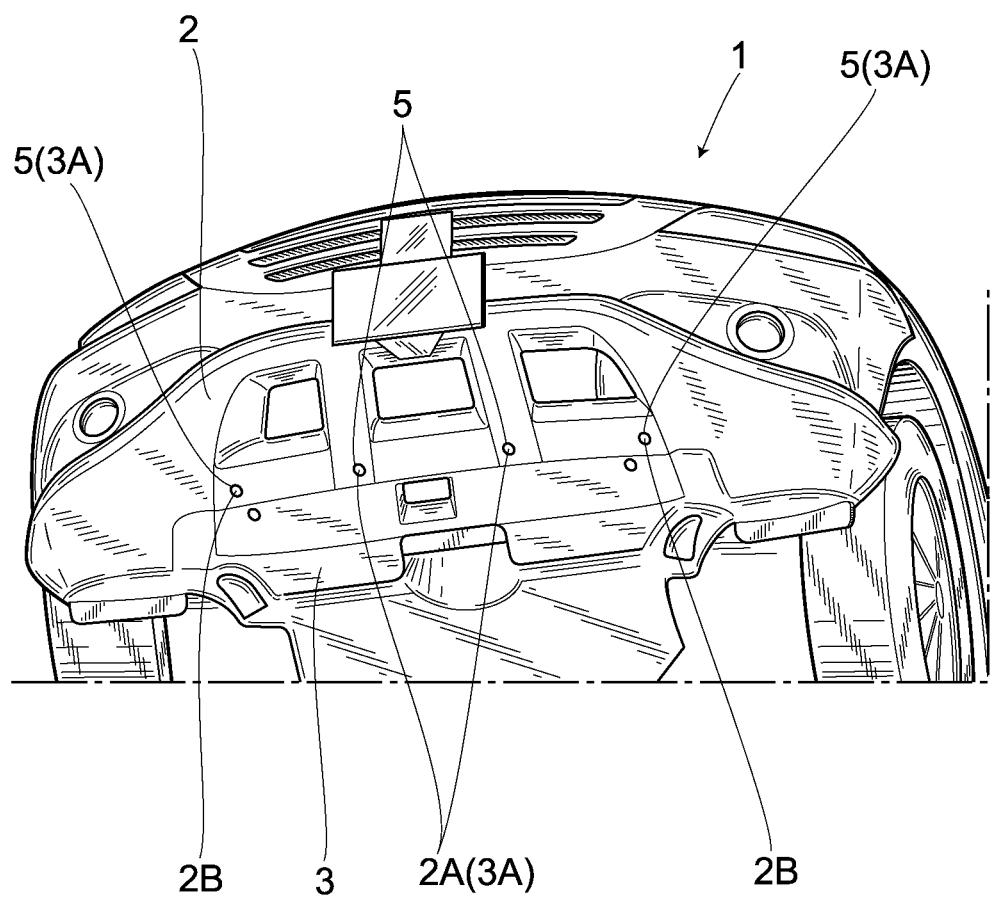
FIG. 1 is a perspective view showing a vehicle viewed from its underneath prior to attaching an exterior component according to the present invention.

FIG. 1 shows the underneath of a vehicular main body 1. A bumper 2 is attached so as to be capable of covering a front end portion of the vehicular main body 1 and is made of urethane resin, a PP material, an FRP material or the like. In the bumper 2, a first attaching hole 2A and a second attaching hole 2B are bored.

A splash shield 3 serves as an undercover of the vehicular main body 1 for protecting a power engine, a power transmission device or the like. The splash shield 3 is provided such that a part of its attaching portion is overlapped on the inner surface of the bumper 2. Using appropriate attachment members, the bumper 2 is attached to the vehicular main body 1 at the first attaching hole 2A, the second attaching hole 2B and other attaching portions not shown.

Figure 2:
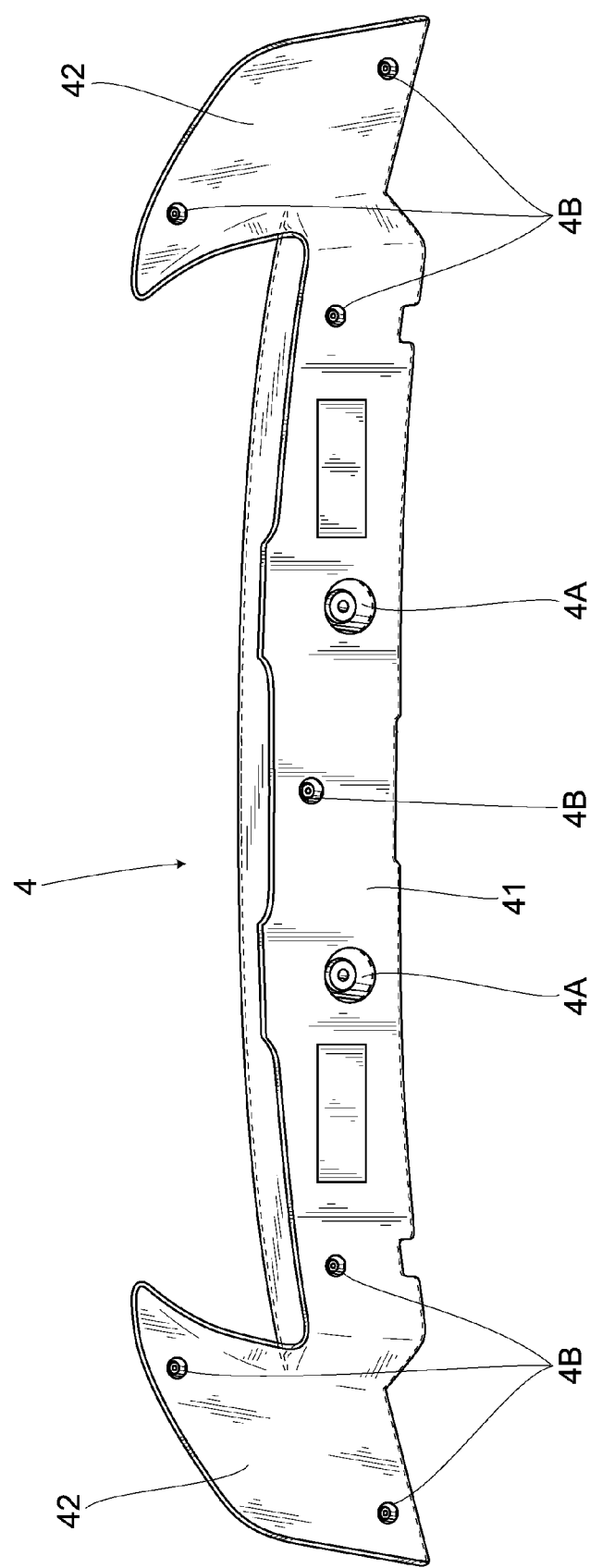
FIG. 2 is a bottom view illustrating an overall structure of the exterior component according to the present invention.

As shown in FIG. 2, the method of the present embodiment is described using a front lower garnish as an example of the exterior component 4. The present invention, however, is not limited to this front lower garnish and can be applied to a method for attaching a variety of accessories capable of being attached to a vehicular bumper, such as a rear lower garnish, a skid guard, a skid plate, an under spoiler, various aero parts or the like.

Then, the exterior component 4 shown in FIG. 2 according to the present embodiment includes an exterior component body 41 horizontally elongated and protrusions 42, 42 as both side portions which are provided on both sides of the exterior component body 41 and are integrated with the exterior component body 41. The protrusion 42 is formed in a forwardly-protruding manner and its front section is sharply formed, thereby mainly improving aesthetic appearance of the vehicle when viewing the vehicle from its front side and also performing a rectifying effect of air in vehicle travel. The exterior component 4 is formed with two first through-holes 4A at right and left sides of the substantial center thereof. The first though-hole 4A is used for temporary fixing and final attachment which are performed by using the attachment members of the bumper 2 attached to the underneath of the vehicular main body 1. These first through-holes 4A are bored corresponding to the first attaching holes 2A.

Furthermore, at the time of temporarily fixing the exterior component 4, second through-holes 4B are bored in appropriate locations of the exterior component 4 in order to be used as a marking during the temporary fixing and used for attaching the exterior component 4. In this example, as shown in FIG. 2, the second through-hole 4B, being a second attaching location of an attachment member, is bored at three locations in the center in the horizontal direction and on both sides of the exterior component body 41 and at two locations of a front section and rear section in the protrusion 42. Further, the exterior component 4 is formed from various kinds of raw materials such as aluminum, titanium, steel, stainless steel or the like.

Then, vehicular main body side attaching holes 3A corresponding to the first attaching hole 2A and second attaching hole 2B of the bumper 2 are bored in the splash shield 3 to allow a clip 5 that penetrates the first attaching hole 2A to be inserted into the vehicular main body side attaching hole 3A and besides allow the clip 5 that penetrates the second attaching hole 2B to be inserted into the vehicular main body side attaching hole 3A. As a result, the bumper 2 is fixed to the splash shield 3. In addition, the clip 5, being an attachment member, can be repeatedly attached and detached by utilizing a tool.

Figure 4:
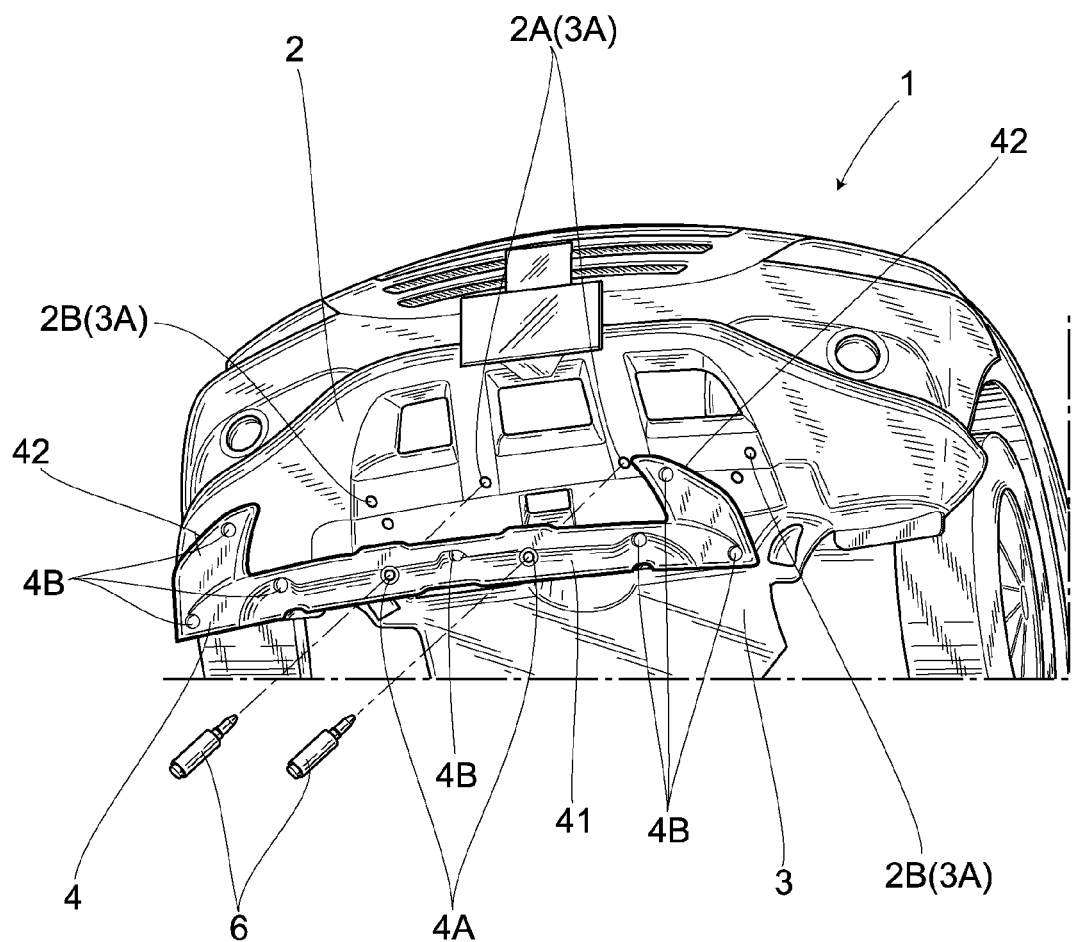
FIG. 4 is a perspective view illustrating an attaching structure of the exterior component obtained when viewing a vehicular body from its underneath according to the present invention.

Next is a description of a process flow of an attaching method when attaching the exterior component 4 on the underneath of the bumper 2 of the vehicular main body 1. As shown in FIG. 3(A) and FIG. 4, in the process of temporarily fixing the exterior component 4 to the bumper 2, first, the clip 5, being a locking member locked to the first attaching hole 2A of the bumper 2 and the vehicular main body side attaching hole 3A of the splashguard 3 is detached using a specialized tool 6 such as a driver, a socket wrench or the like. Next, as shown in FIG. 3(B) and FIG. 4, when temporarily fixing the exterior component 4, the first attaching hole 2A and the first through-hole 4A are allowed to face each other to fit the clip 5 into the first through-hole 4A, the first attaching hole 2A and the vehicular main body side attaching hole 3A, thus fixing the clip 5 thereto. At this time, the exterior component 4 is attached to the bumper 2 with the second attaching hole 2B bored in the bumper 2 being covered. As a result, the process of temporarily fixing the exterior component 4 is completed to fix the exterior component 4, the bumper 2 and the splashguard 3 together by means of the clip 5, thereby enabling the location of the second through-hole 4B on the bumper 2 to be determined. In this case, the first through-hole 4A is served as the first attaching location of the exterior component 4 temporarily fixed, and the second through-hole 4B is served as the second attaching location other than the first attaching location.

Figure 5:
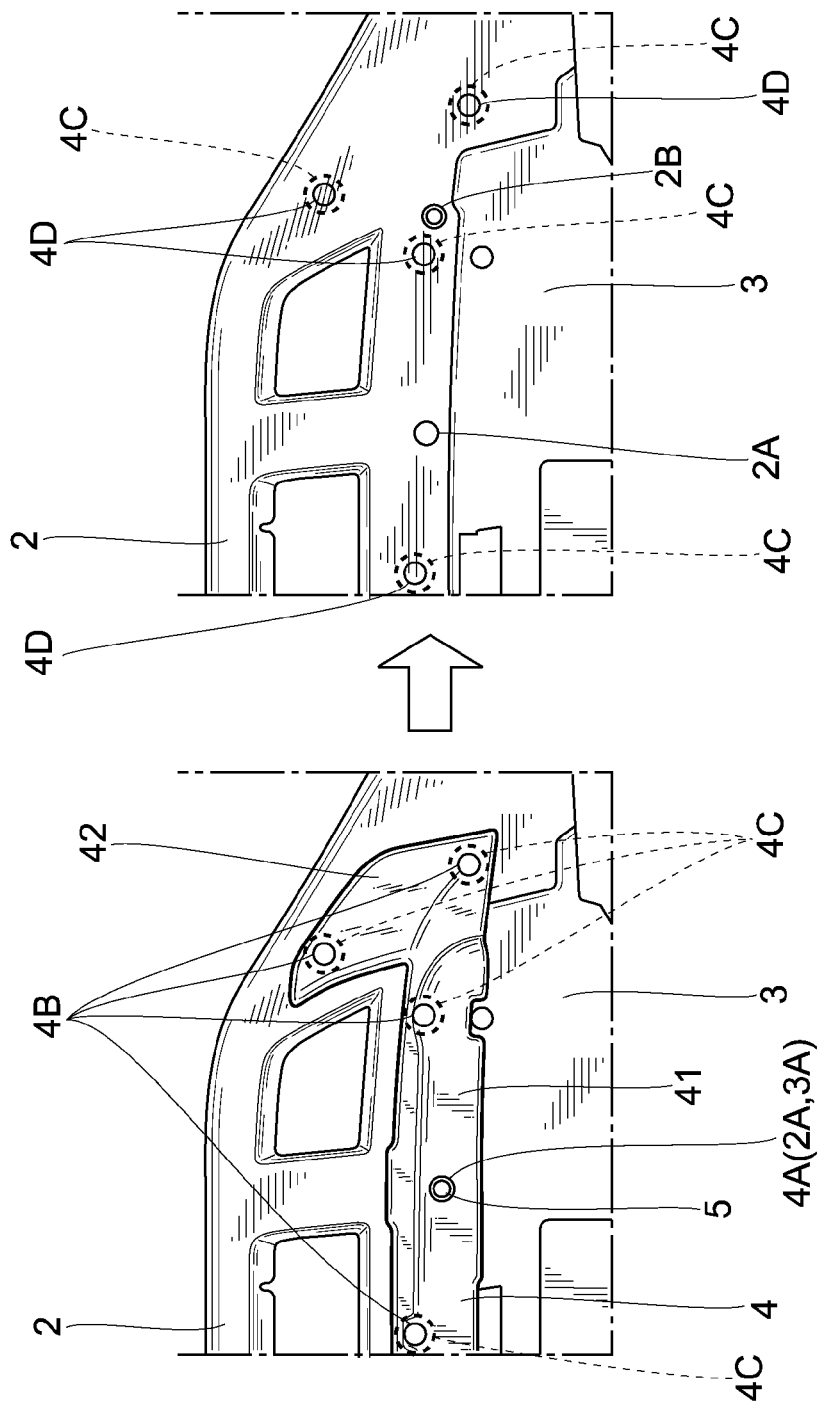
FIG. 5 is an explanatory drawing illustrating a procedure for marking in the process of attaching the exterior component according to the present invention.

Next, a description of a marking process of the exterior component 4 is given with reference to FIG. 5. The exterior component 4 is locked by a plurality (two) of the clips 5 shown in FIG. 5, thereby determining attaching location thereof. Then, a temporarily fixing location 4C can be created in an appropriate location of the bumper 2 via the second through-hole 4B. As shown in FIG. 5(B), utilizing the temporarily fixing location 4C of the second through-hole 4B, it becomes possible to apply a marking 4D to an inner diametrical portion of the second through-hole 4B. After the marking 4D is applied thereto, the clip 5 fitted into the first through-hole 4A, the first attaching hole 2A and the vehicular main body side attaching hole 3A is detached, and then the exterior component 4 is temporarily detached from the bumper 2.

Note that there is no particular limit on the means for the marking 4D and various means including a marking paint, a scratch gage, an impact driver with a pointed extremity member or the like can be employed. Thus, the location provided with the marking 4D is to become a determined location.

Figure 6:
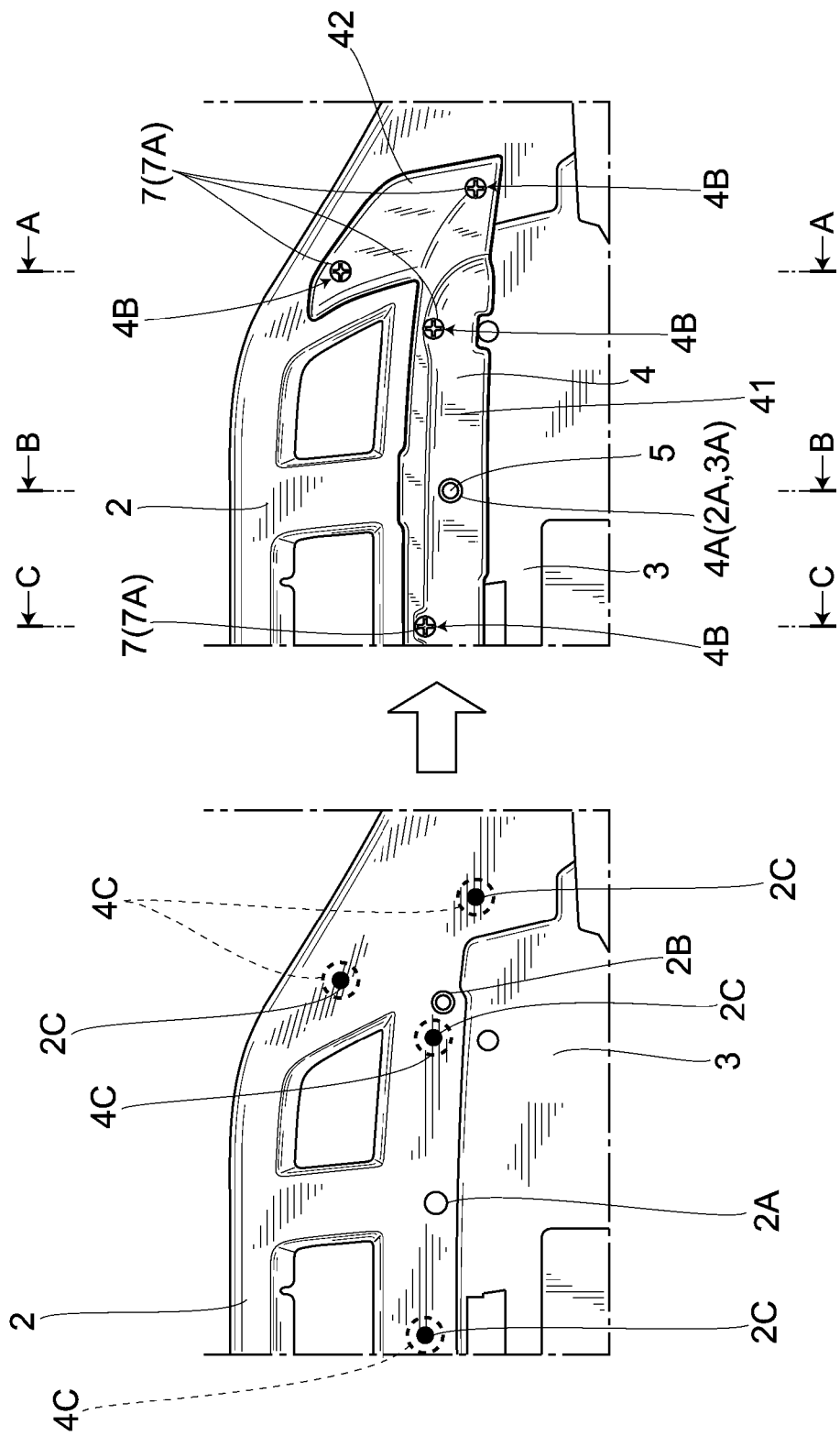
FIG. 6 is an explanatory drawing illustrating a procedure for attaching in the process of attaching the exterior component according to the present invention.

With respect to the final attaching process of the exterior component 4, as shown in FIG. 6(A), after detaching the exterior component 4 from the bumper 2 in the marking process described above, third attaching holes 2C, being an attaching hole for a receiving portion, are formed by boring a hole in an appropriate location of the temporarily fixing position 4C in the bumper 2 provided with the marking 4D. In the meantime, for the purpose of facilitating understanding, the third attaching hole 2C is shown by a black dot in FIG. 6. Further, an attachment member such as a bolt, a nut or the like is joined to the third attaching hole 2C. It is desirable to use a fastening means which takes advantage of the characteristic of an elastic material such as a general-purpose well nut 7 or the like employed in the present embodiment. Then, a well nut 7 is fitted in the inner diameter of the third attaching hole 2C to be appropriately joined to the third attaching hole 2C, thereby abutting the exterior component 4 onto the bumper 2 again and attaching the clip 5 into the first through hole 4A as shown in FIG. 6(B). After that, the bolt 7A of the well nut 7 is inserted into the second through-hole 4B corresponding to the third attaching hole 2C and then is fastened, thereby completing the attaching process for attaching exterior component 4 on the bumper. In addition, in this example, the clip 5 serves as an attachment member, and the well nut 7 serves as the other attachment member.

Figure 7:
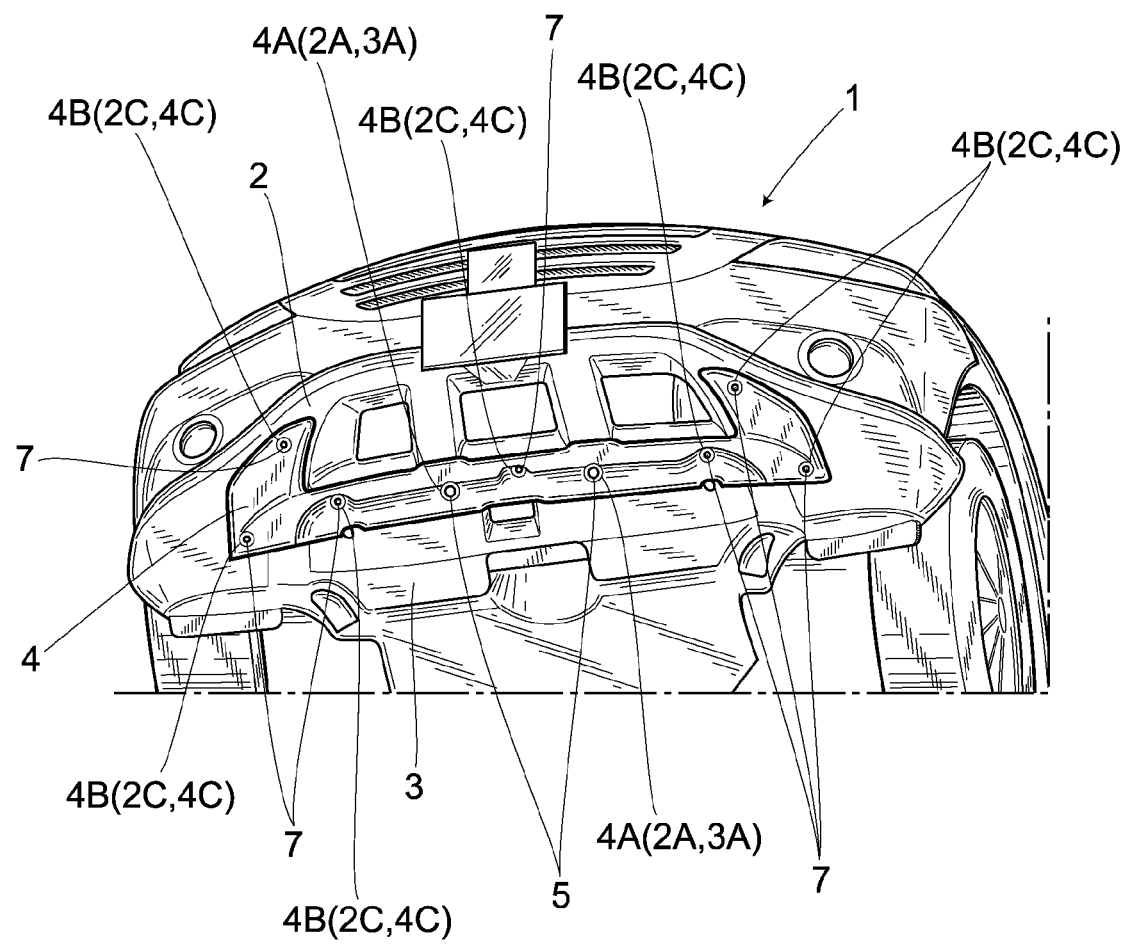
FIG. 7 is a perspective view obtained when viewing the vehicle from its underneath, illustrating a state where the exterior component is attached toto the vehicle according to the present invention.

FIG. 7 shows a general overview of the attaching process of the exterior component 4 attached to the underneath of the bumper 2 of the vehicular main body 1. As described above, according to the present method for attaching an exterior component, in the first temporarily fixing process, the bumper 2 is temporarily fixed using the clip 5 in order to fix the first through hole 4A of the exterior component 4, and the first attaching hole 2A of the bumper 2 and the vehicular main body side attaching hole 3A, together. Next, according to the marking process, in the temporarily fixed state described above, the marking 4D for determining a location is applied on the temporarily fixing position 4C, acting as an abutting location of the bumper 2, via the second through-hole 4B of the exterior component 4. The exterior component 4 is once detached from the bumper 2. Then, a hole is bored in the location of the marking 4D of the bumper 2, and the third attaching hole 2C is thus formed, thereby fitting the well nut 7 to the third attaching hole 2C. Further, in the final attaching process, the clip 5 is fitted in the first through-hole 4A to fasten the well nut 7 via the second through-hole 4B, thereby completing the attachment of the exterior component 4. Besides, as described above, the second through-hole 4B formed in the exterior component 4 is utilized in the both processes of the marking 4D and the attachment of the exterior component 4 on the bumper 2, thereby improving the positioning accuracy at the time of completing the attaching work.

The well nut 7 joined to the third attaching hole 2C for the purpose of fixing the exterior component 4 is described with reference to FIG. 8 and FIG. 9. The well nut 7 employed in the present embodiment serves as a fastening member formed by embedding a nut made of a metal or the like in synthesized rubber such as chloroprene rubber or the like. The well nut 7 is a general-purpose product which is easily attachable and detachable and is able to perform attachment by fastening a screw from one side. Furthermore, the well nut 7 is wholly covered with an elastic material, thereby achieving effects such as vibration absorption and insulation.

Figure 8:
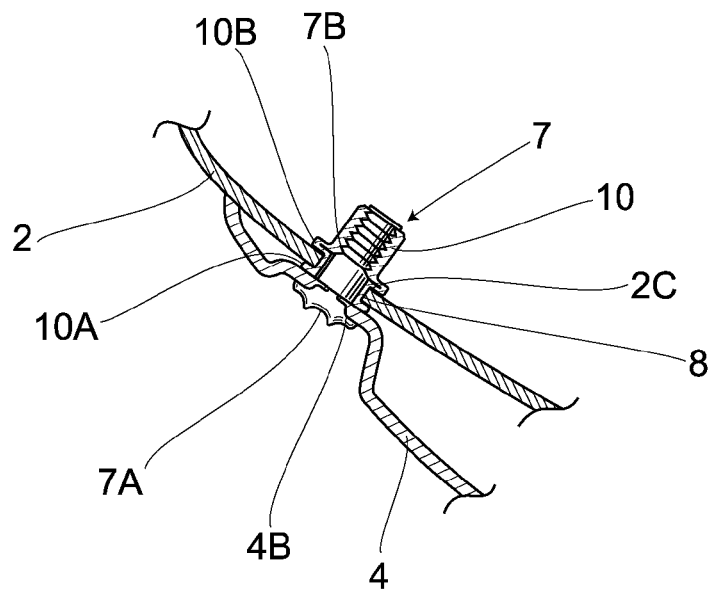
FIG. 8 is a cross-sectional view on an A-A line in FIG. 6 according to the present invention.
Figure 9:
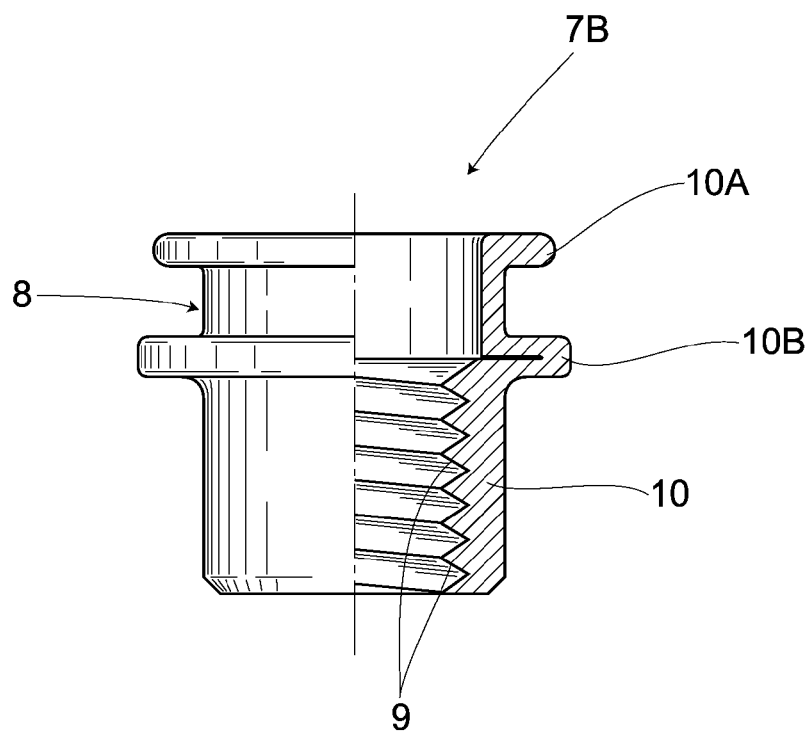
FIG. 9 is a cross-sectional view of an attachment member for the exterior component according to the present invention.

As shown in FIG. 8 and FIG. 9, the well nut 7 is joined to the third attaching hole 2C bored in the bumper 2. Further, the well nut 7 is made up of a fastening bolt 7A, being an attachment member for a receiving portion and a fitting nut 7B, being the receiving portion. Then, the fastening bolt 7A is allowed to pass through the second through-hole 4B of the exterior component 4 to be fastened together with the fitting nut 7B joined to the third attaching hole 2C described above, thereby completing the attaching and fixing of the bumper 2 and exterior component 4.

Further, the fastening bolt 7A is allowed to be inserted from an opening of a nut head 10A and is fitted into an internally threaded bore 9 to be fastened, so that the outside 10 of the fitting nut 7B expands while deforming, thereby forming a protrusion 10B. Thus, when being fitted into the bumper 2, the fitting nut 7B is formed with a fitting portion 8 in the form of a depression between the nut head 10A and the protrusion 10B, so that the bumper 2 is sandwiched to be fixed.

In this manner, the well nut 7, acting as a attachment member for a receiving portion and a receiving portion, allows the fitting nut 7B to be fitted into the third attaching hole 2C of the bumper 2 to fasten the fastening bolt 7A from the second through-hole 4B via the exterior component 4 and thus the protrusion 10B is formed while the outside 10 of the well nut 7 expands. The well nut 7 described above enables the fitting nut 7B, being the receiving portion, to be infallibly fitted into the third attaching hole 2C of the bumper 2 and fixed thereto by utilizing the characteristic of the elastic member.

Figure 10:
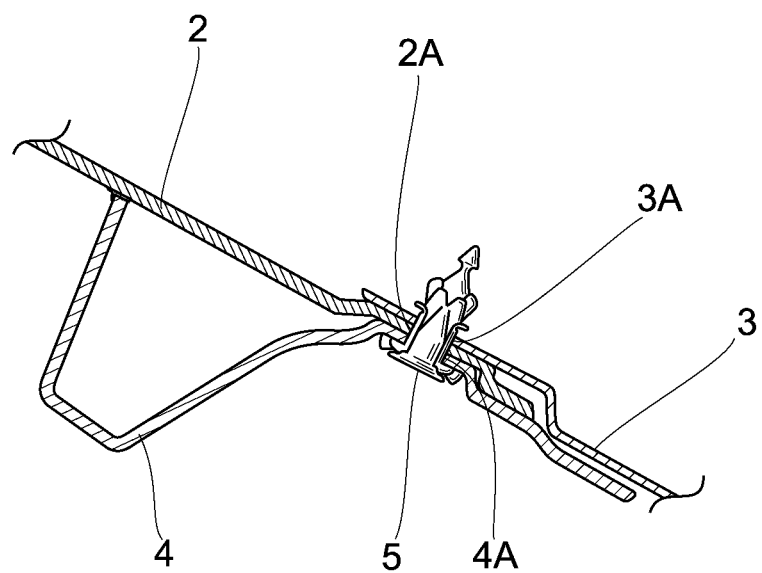
FIG. 10 is a cross-sectional view on a B-B line in FIG. 6 according to the present invention.

Next is a description of how the clip 5 locked to the first attaching hole 2A of the bumper 2 is attached with reference to FIG. 10. With respect to the clip 5, it is preferred to use a clip such as a general-purpose rivet type one or the like which is formed from synthesized resin or the like and is easily attachable and detachable. Further, when attaching the clip 5, as shown in FIG. 10, the clip 5 is allowed to be fitted into the first attaching hole 2A, the vehicular main body side attaching hole 3A and the first through-hole 4A, which are bored in the bumper 2, the splashguard 3 and the exterior component 4 respectively, thereby fastening them together.

Figure 11:
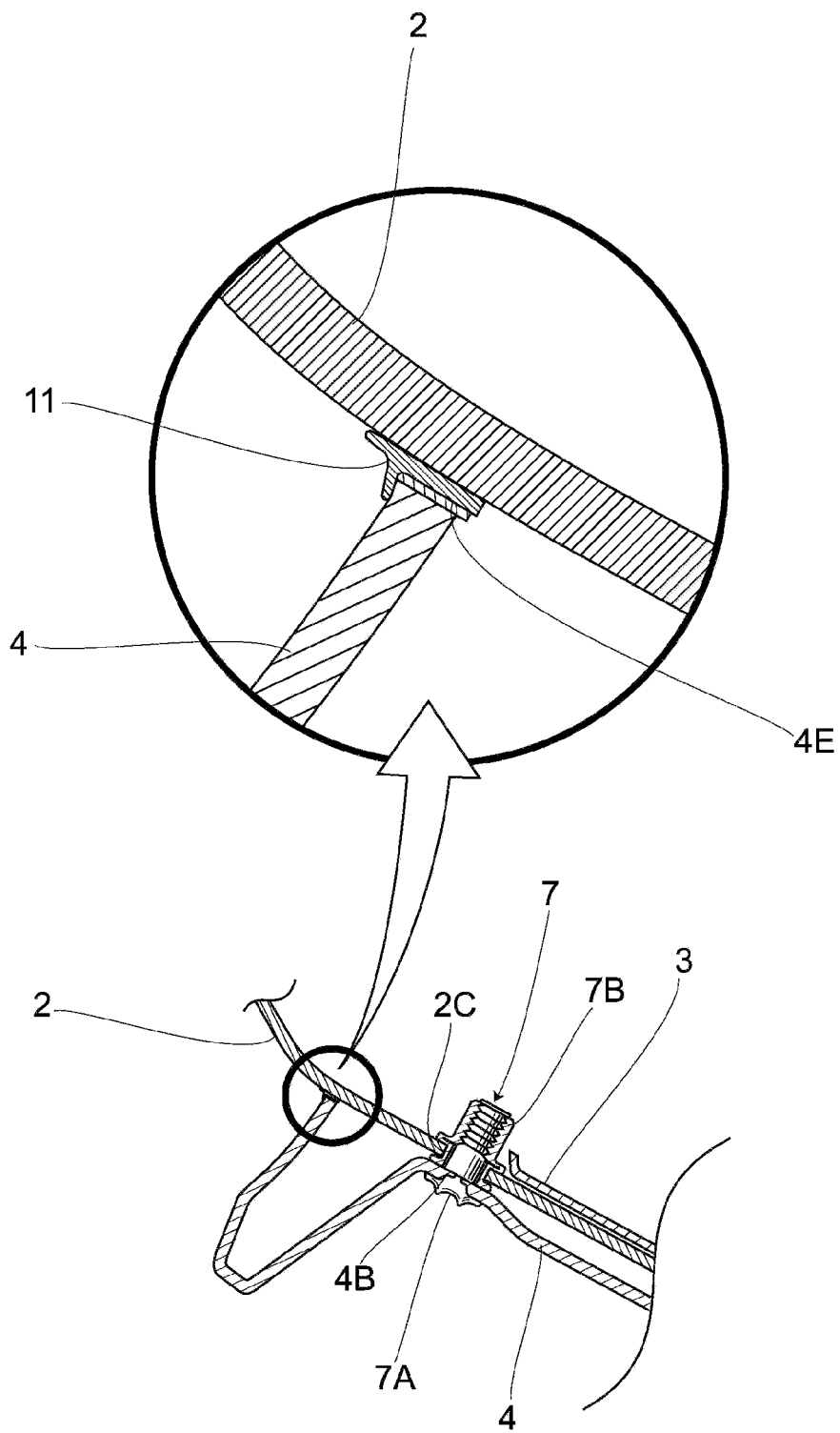
FIG. 11 is a cross-sectional view on a C-C line in FIG. 6 according to the present invention.

With respect to attaching the exterior component 4 on the bumper 2, as shown in FIG. 11, an elastic gasket 11 acting as an elastic seal member is provided by means of bonding or the like in a distal contact portion 4E on both sides portion of the exterior component 4. When attaching the exterior component 4, the elastic gasket 11 is attached to a contact portion between the exterior component 4 and the bumper 2 in a sandwiched manner. Further, the elastic gasket 11 exerts the effects of enhancing the waterproof performance between the exterior component 4 and the bumper 2 and preventing the breaking and damaging of the contact portion.

As described above, in the present embodiment, according to the first aspect of the present invention, there is provided the method for attaching the exterior component 4 onto the bumper 2 fixed to the vehicular main body 1 by a plurality of the clips 5 acting as the attachment member. According to the method, the exterior component 4 is temporarily fixed by some of the plurality of the clips 5 by which the bumper 2 is fixed. In this temporarily fixed state, the second through-hole 4B, corresponding to the second attaching location other than the first attaching location of the exterior component 4, determines its attaching location on the bumper 2. After this determination of the attaching location, the exterior component 4 is detached, and then the fitting nut 7B, acting as the receiving portion, is provided in the determined location of the bumper 2. After that, the exterior component 4 is fixed to the bumper 2 using the fitting nut 7B. Therefore, utilizing some of the plurality of the clips 5 in the bumper 2 and the vehicular main body 1 when attaching the exterior component 4, the determination of the locations of the second through-holes 4B in the exterior component 4 corresponding to the vehicular main body 1 can be reliably performed while temporarily fixing the exterior component 4 to the bumper 2.

In this manner, when attaching the exterior component 4 on the bumper 2, the exterior component 4 can be attached without detaching the bumper from the vehicular main body 1, thus permitting the attaching man-hours to be reduced and the accuracy of the attaching location of the exterior component 4 to be improved without employing a paper template or the like.

Further, as described above in the present embodiment, according to the second aspect of the present invention, the first attaching location corresponds to the first through-hole 4A provided in the exterior component 4 and the second attaching location to the second through-hole 4B provided in the exterior component 4. The marking 4D is put on the determined location of the bumper 2, and then the third attaching hole 2C, acting as the attaching hole for the receiving portion, is bored in the determined location and after that, the fitting nut 7B, acting as the receiving portion, is provided in the third attaching hole 2C, and then the fastening bolt 7A, acting as an attachment member, is allowed to penetrate the second through-hole 4B and is locked to the fitting nut 7B. Therefore, the clip 5 for attaching the bumper 2 on the vehicular main body 1 is detached, the clip 5 thus detached is allowed to penetrate the first through-hole 4A to temporarily fix the exterior component 4 to the bumper 2, and after applying the marking 4D, the clip 5 is detached to detach the exterior component 4 from the bumper 2, and the fitting nut 7B is provided in the location provided with the marking 4D. As a result, the fitting nut 7B can be provided at the accurate location corresponding to the second through-hole 4B, thus enabling the accuracy of the determined location of the exterior component 4 to be improved.

Moreover, as the effect resulting from the present embodiment, by means of a plurality of the clips 5 for fixing the bumper 2, the exterior component 4 and the bumper 2 are fixed to the splashguard 3 and thus can be fixed to the vehicular main body 1. Further, the exterior component 4 includes the protrusions 42, 42 on both sides of the exterior component body 41 that is horizontally elongated. Then, the exterior component 4 is temporarily fixed through the first through-hole 4A in the middle portion of the exterior component body 41 and the marking 4D is put on the position on the bumper 2, corresponding to the location of the second through-hole 4B of the protrusion 42. Therefore, the third attaching hole 2C distant away from the first through-hole 4A in the middle can be provided in an accurate location.

Further, the exterior component 4 includes the first through-hole 4A, acting as a first attaching hole, facing the first attaching location of the bumper 2 relative to the vehicular main body 1, and the second through-hole 4B, acting as a second attaching hole, facing the second attaching location of the bumper 2. The exterior component 4 is temporarily fixed by the clip 5, acting as an attachment member, which is inserted into the first through-hole 4A facing the first attaching location, and the marking 4D acting as a mark which is utilized for temporary fixing and for determining the second attaching location is applied through the second through-hole 4B. Then, the exterior component 4 is once detached from the bumper 2, and the exterior component 4 is then attached to the bumper 2 by joining the well nut 7 to the marking 4D. In this way, utilizing the first attaching hole 2A acting as the attaching location where the bumper 2 is attached to the vehicular main body 1, the exterior component 4 is attached through the first through-hole 4A to the bumper 2, thereby temporarily fixing the exterior component 4 with ease, and at the same time, the exterior component 4 can be reliably positioned relative to the vehicular main body 1.

Furthermore, the fixing location of the exterior component 4 can be selected and determined by applying the marking 4D to the second attaching location against which the second through-hole 4B faces. Besides, after having detached the exterior component 4 once, the well nut 7 is fitted in the location of the marking 4D, thereby permitting the exterior component 4 to be easily attached without employing a paper template or the like, without the need of detaching the bumper 2 from the vehicular main body 1.

Moreover, the temporary fixing as well as the determination of the attaching location can be performed through substantially the same process and therefore the attaching man-hours can be reduced, and the accuracy of the attaching location of the exterior component 4 can be improved.

Further, the exterior component 4 is attached by the simple means such as the clip 5 and the well nut 7 and therefore the exterior component 4 is easily attached to or detached from the bumper 2, enabling the detachment and attachment of the exterior component 4 over any number of times after having attached the exterior component 4.

It should be noted that the present invention is not limited to the foregoing embodiment and various modifications are possible within the scope of the gist of the present invention. For example, whilst the exterior component 4 according to the present invention is provided with two first through-holes and seven second through-holes, the invention is not limited to these numbers of holes and any appropriate numbers thereof may be selected depending on a vehicle characteristic such as shape, size, utilization, and specification. Further, the same goes for the clip acting as the locking member and the well nut acting as the attachment member, and therefore, any attachment member such as a usual set of bolt and nut, a grommet or the like may be employed instead of them.

What is claimed is:

1. A method for attaching an exterior component on a bumper fixed to a vehicular main body through a plurality of attachment members, said method comprising steps of:
   temporarily fixing said exterior component to said vehicular main body at a first attaching location on said bumper, together with said bumper, by means of at least one of said attachment members used to fix said bumper to said vehicle main body;
   determining a second attaching location on said bumper other than said first attaching location in a state of having said exterior component temporarily fixed;
   detaching said exterior component after determining said second attaching location;
   providing a receiving portion in said second attaching location determined on said bumper, and
   fixing said exterior component to said bumper using said receiving portion,
   wherein said first attaching location corresponds to a first through-hole provided in said exterior component, while said second attaching location corresponds to a second through-hole provided in said exterior component, and
   wherein said method further comprises the steps of:
   putting a marking on said second attaching location determined on said bumper;
   boring an attaching hole for the receiving portion in said second attaching location determined;
   providing said receiving portion in said attaching hole for the receiving portion; and
   locking another of said attachment members for the receiving portion penetrating said second through-hole to said receiving portion.

2. The method for attaching an exterior component according to claim 1, wherein said marking is put on said second attaching location determined of said bumper with the exterior component being temporarily fixed to said bumper.

3. The method for attaching an exterior component according to claim 1, wherein said exterior component includes a plurality of said first through-holes.

4. The method for attaching an exterior component according to claim 1, wherein after applying said marking, said exterior component is detached and then said attaching hole for the receiving portion is bored in said second attaching location determined.

5. The method for attaching an exterior component according to claim 1, wherein said attachment member is repeatedly attachable and detachable for reuse, using a tool and is allowed to penetrate said first through-hole to enable the bumper to be temporarily fixed and then finally fixed.

6. The method for attaching an exterior component according to claim 1, wherein said exterior component includes a plurality of said second through-holes.

7. The method for attaching an exterior component according to claim 1, wherein an elastic seal member is provided in a distal contact portion of said exterior component, and when fixing said exterior component, said elastic seal member is sandwiched in a contact portion between said exterior component and said bumper.

8. The method for attaching an exterior component according to claim 1,
   wherein said exterior component comprises an exterior component body elongated in a horizontal direction of said vehicle main body and side portions provided integrally on both sides of said exterior component body,
   wherein said first through-hole is provided in the middle portion of said exterior component body and said second through-holes are provided on the both side portions.

* * * * *